United States Patent [19]

Song et al.

[11] Patent Number: 5,413,799
[45] Date of Patent: May 9, 1995

[54] METHOD OF MAKING FRUIT-FLAVORED CHEWING WITH PROLONGED FLAVOR INTENSITY

[75] Inventors: Joo H. Song, Northbrook; Kevin B. Broderick, Berwyn, both of Ill.

[73] Assignee: Wm. Wrigley Jr. Company, Chicago, Ill.

[21] Appl. No.: 226,463

[22] Filed: Apr. 12, 1994

[51] Int. Cl.$^6$ .............................................. A23G 3/30
[52] U.S. Cl. ............................................ 426/3; 426/6
[58] Field of Search ........................................ 426/3–6

[56] References Cited

U.S. PATENT DOCUMENTS

| | | | |
|---|---|---|---|
| 2,288,100 | 6/1942 | Manson | 99/135 |
| 2,413,239 | 12/1946 | Manson et al. | 260/4 |
| 2,504,436 | 4/1950 | McCoubrey et al. | 260/89.1 |
| 2,519,775 | 8/1950 | Lougovoy | 99/135 |
| 2,704,753 | 3/1955 | Monaghan | 260/89.1 |
| 3,984,574 | 10/1976 | Comollo | 426/4 |
| 4,188,406 | 2/1980 | Sarkisian et al. | 426/3 |
| 4,352,822 | 10/1982 | Cherukuri et al. | 426/4 |
| B1 4,352,822 | 9/1985 | Cherukuri et al. | 426/4 |
| 4,357,355 | 11/1982 | Koch et al. | 426/4 |
| 4,452,820 | 6/1984 | D'Amelia et al. | 426/3 |
| 4,490,395 | 12/1984 | Cherukuri et al. | 426/3 |
| 4,525,363 | 6/1985 | D'Amelia et al. | 426/3 |
| 4,721,620 | 1/1988 | Cherukuri et al. | 426/6 |
| 4,794,003 | 12/1988 | Cherukuri et al. | 426/6 |
| 4,915,958 | 4/1990 | Faust et al. | 426/3 |
| 4,933,189 | 6/1990 | Cherukuri et al. | 426/3 |
| 4,986,991 | 1/1991 | Yatka et al. | 426/3 |
| 5,057,327 | 10/1991 | Yatka et al. | 426/3 |
| 5,057,328 | 10/1991 | Cherukuri et al. | 426/5 |
| 5,082,671 | 1/1992 | Cherukuri | 426/3 |
| 5,106,632 | 4/1992 | Wong et al. | 426/3 |
| 5,110,608 | 5/1992 | Cherukuri et al. | 426/3 |
| 5,116,626 | 5/1992 | Synosky et al. | 426/3 |
| 5,133,977 | 7/1992 | Patel | 426/3 |
| 5,139,787 | 8/1992 | Broderick et al. | 424/486 |
| 5,139,793 | 8/1992 | Johnson et al. | 426/3 |
| 5,139,794 | 8/1992 | Patel et al. | 426/3 |
| 5,158,790 | 10/1992 | Witkewitz et al. | 426/3 |
| 5,266,336 | 11/1993 | McGrew et al. | 426/4 |
| 5,286,501 | 2/1994 | Song et al. | 426/3 |

FOREIGN PATENT DOCUMENTS

| | | | |
|---|---|---|---|
| 1007107 | 8/1973 | Canada | 99/139 |
| 2027177 | 4/1991 | Canada | A23G 3/30 |
| 0066864 | 12/1982 | European Pat. Off. | A23G 3/30 |
| 0242325 | 10/1987 | European Pat. Off. | A23G 3/30 |
| 0453397 | 3/1991 | European Pat. Off. | A23L 1/22 |
| 0453402 | 10/1991 | European Pat. Off. | A23G 3/30 |
| 0485170 | 5/1992 | European Pat. Off. | A23G 3/30 |
| 49-042855 | 4/1974 | Japan | . |
| 91-47828 | 5/1985 | Japan | A23G 3/30 |
| 61-56979 | 12/1986 | Japan | A23G 3/30 |
| 2-245139 | 9/1990 | Japan | A23G 3/30 |
| 84/5846 | 7/1984 | South Africa | . |
| 2159384 | 12/1985 | United Kingdom | A23G 3/00 |
| 2226745 | 7/1990 | United Kingdom | A23G 3/30 |
| 90-08478 | 8/1990 | WIPO | A23L 1/187 |

OTHER PUBLICATIONS

Billmeyer—*Textbook of Polymer Science*, Second edition (1971), pp. 24–26.

Brandrup & Immergut—*Polymer Handbook*, Third edition (1989), pp. VII–519–VII–559.

*Primary Examiner*—Jeanette Hunter
*Attorney, Agent, or Firm*—Maxwell J. Petersen; Willian Brinks Hofer Gilson & Lione

[57] ABSTRACT

A method is provided for making a free fruit-flavoring chewing gum having enhanced long-term flavor intensity. A restrainer is selected which has a solubility parameter within $\pm 2.0$ $[J/m^3]^{\frac{1}{2}} \times 10^{-3}$ of the solubility parameter of a free fruit flavoring agent in the chewing gum. The restrainer is added to the chewing gum in an amount sufficient to prolong the pleasant chewing life of the gum by at least one minute, and often by two or more minutes. Further flavor enhancement can be achieved by increasing the amount of the restrainer, increasing the molecular weight of the restrainer, or increasing the amount of free fruit flavoring agent once the restrainer has been properly selected.

22 Claims, 4 Drawing Sheets

FLAVOR QUALITY

METHOD OF MAKING FRUIT-FLAVORED CHEWING WITH PROLONGED FLAVOR INTENSITY

FIELD OF THE INVENTION

This invention relates to a method of making a free fruit-flavored chewing gum having an enhanced long-term flavor intensity, without sacrificing the initial flavor burst, and without requiring the use of certain flavor encapsulation techniques.

BACKGROUND OF THE INVENTION

Solubility is believed to occur between materials, for example, a solvent and a polymer, when the Gibbs free energy of mixing is less than zero. The energy of mixing is discussed by Dr. Billmeyer in the "Textbook Of Polymer Science", Second Edition, John Wiley and Sons, Inc. (1975), pages 24–26, the disclosure of which is incorporated herein by reference. As explained by Dr. Billmeyer, the free energy of mixing $\Delta G$ is defined according to the following equation:

$$\Delta G = \Delta H - T\Delta S,$$

wherein $\Delta H$ represents the enthalpy of mixing, $\Delta S$ represents the entropy of mixing, and $T$ is the absolute temperature.

For reasonably nonpolar molecules, and where the degree of hydrogen bonding is insignificant or nonexistent, the enthalpy of mixing is positive and can be derived from the following equation:

$$\Delta H = V_1 V_2 (\delta_1 - \delta_2)^2,$$

wherein $V$ is the volume fraction and subscripts 1 and 2 refer to the solvent and the polymer, respectively. The quantity $\delta^2$ is the cohesive energy density of an ingredient. The quantity $\delta$, which represents the square root of the cohesive energy density, is known as the Solubility Parameter.

Generally, ill the absence of significant hydrogen bonding, solubility can be expected to occur between a solvent and a polymer if the difference in Solubility Parameters $(\delta_1 - \delta_2)$ is less than about 1.7–2.0. In other words, materials having similar Solubility Parameters tend to reach thermodynamic equilibrium when they are mixed together, and this tendency toward equilibrium causes the different molecules to attract and mix with each other. Materials having dissimilar Solubility Parameters tend to reach thermodynamic equilibrium when separated, and this causes the different molecules to repel and separate from each other.

The Solubility Parameters of different substances have been the subject of various calculations and publications. For a polymer, a relatively easy way to determine $\delta_2$ is from a summation of molar attraction constants multiplied by the density and divided by the repeating unit molecular weight:

$$\delta_2 = \frac{\rho \Sigma E_i}{M.W.}$$

wherein $\Sigma$ is the summation operator, $E_i$ is the molar attraction constant for each chemical moiety making up the repeating unit, $M.W.$ is the molecular weight of the repeating unit, and $\rho$ is the polymer density.

The Solubility Parameter ($\delta_1$ or $\delta_2$) can be expressed in Solubility Parameter Units (S.P.U.'s), with one S.P.U. being equal to one $[J/m^3]^{\frac{1}{2}} \times 10^{-3}$, where $J$=Joules and $m$=meters. For a more detailed explanation of the Solubility Parameter and its values for various compounds, see the Third Edition of "Polymer Handbook", edited by Bandrup and Immergut, and published by John Wiley and Sons, Inc., New York, N.Y., in 1989. The chapter of the "Polymer Handbook", beginning on page VII/519, and entitled "Solubility Parameters", is incorporated herein by reference.

Fruit-flavored chewing gums (whether they be wax-containing or wax-free) have a well-known characteristic or problem of rapid flavor release and short flavor duration. Fruit-flavored chewing gums have a tendency to exhibit a very rapid flavor release in the early stages of chewing, followed by rapid dissipation until the fruit flavor becomes virtually undetectable after 8–12 minutes of chewing.

This problem has been addressed in the prior art by using certain encapsulation techniques for slowing the release of fruit flavors. However, these encapsulation techniques present an additional problem in that they operate by creating a physical barrier to modify the release of fruit flavors. Also, the pleasing initial flavor burst associated with fruit-flavored gum is, to some extent, sacrificed when these encapsulation techniques are used. Additionally, it is known that a large percentage of the fruit flavor initially added to the chewing gum (in some cases, up to 60%) is never actually tasted by the consumer.

In order to provide a pleasing long-lasting flavor to a free fruit flavored chewing gum, it is generally desirable to prolong the time period during which at least 15% of the original flavor intensity is apparent to the consumer. In other words, the consumer initially detects a flavor burst of a relatively high intensity when chewing is commenced. Thereafter, the detected flavor intensity inevitably declines with time during chewing. When the detected flavor intensity decreases by more than 85% from the original level, the gum becomes annoyingly low in taste and is less pleasant to chew. Therefore, the enjoyable chewing time can be prolonged by prolonging the time during which at least 15% of the original flavor intensity is apparent.

In order to preserve the initial flavor burst and maximize the efficient use of the flavor ingredients, it is desirable that as much of the fruit flavor as possible be in the free (unencapsulated) form. Therefore, there is a considerable demand for a technique for enhancing the long-term detectability of fruit flavors without relying significantly on conventional encapsulation techniques.

SUMMARY OF THE INVENTION

The present invention is method of making a free fruit flavored chewing gum which has enhanced long-term flavor detectability, without relying significantly on flavor encapsulation techniques. The method of the invention can be used to make a new fruit-flavored gum from scratch, or can be used to convert an existing fruit-flavored gum to one having enhanced long-term flavor.

Because flavor encapsulation is not essential, the method of the invention maintains the integrity of the initial flavor burst using free (unencapsulated) flavors, while at the same time changing the rate of flavor dissipation so that the chewing gum maintains at least 15% of its original detectable flavor intensity over a longer period of time. As a result, the consumer experiences a prolonged period of chewing enjoyment.

Generally, the method of the invention will prolong the period of chewing enjoyment by at least one minute, and more often by two or more minutes, compared to conventional fruit-flavored chewing gums. This means that the period of chewing enjoyment, during which the detectable fruit flavor remains at or above 15% of the original flavor intensity, can now be increased to about 10–15 minutes, compared to a previous range of 8–12 minutes, without increasing the amount of fruit flavor added to the chewing gum, and without lowering the intensity of the initial flavor burst. Still longer periods of chewing enjoyment can be obtained by increasing the amount of free fruit flavor used with the chewing gums of the invention, without significantly affecting the initial flavor burst.

The foregoing assumes that the fruit flavor will be in the entirely free (unencapsulated) form. Of course, the benefits of the method of the invention can also be realized in chewing gums that contain some encapsulated fruit flavor provided that there is mostly free fruit flavor present in addition to the encapsulated fruit flavor.

The method of the invention involves selecting and providing, in the chewing gum, a water-insoluble chewing gum ingredient which has a Solubility Parameter within ±2.0 S.P.U.'s of the Solubility Parameter of the free fruit flavor ingredient whose long term flavor is being enhanced. For added benefit, the Solubility Parameter of the water-insoluble ingredient should preferably be within ±1.0 S.P.U.'s of the Solubility Parameter of the free fruit flavor ingredient whose long term flavor is being enhanced. The selected water-insoluble ingredient acts as a restrainer for the free flavor ingredient, slowing its release without encapsulating it.

The selected water-insoluble ingredient should be provided in at least 7% by weight of the entire chewing gum composition, or at least four times the weight percentage of the free flavor ingredient whose flavor is being enhanced, whichever is greater. Preferably, the selected water-insoluble ingredient will be provided in at least five times the weight percentage of the free fruit flavor ingredient whose long term flavor is being enhanced. The selected water-insoluble ingredient may be added as part of the chewing gum base.

When selecting the water-insoluble ingredient, it is important to consider not only the chemical nature of the ingredient, but also its molecular weight. When more than one free fruit flavor ingredient is being used, it is important to consider individually the Solubility Parameter of each fruit flavor for which enhancement is desired. If the different fruit flavors have Solubility Parameters that are close together, then it may be possible to enhance the longevity of more than one fruit flavor using the same water-insoluble ingredient. On the other hand, if the different fruit flavors have Solubility Parameters which are far apart, then it may be necessary to add more than one properly selected water-insoluble ingredient to provide long-term enhancement of the different fruit flavors.

With the foregoing in mind, it is a feature and advantage of the invention to provide a method of making a fruit-flavored chewing gum having a pleasant chewing life at least one minute longer, and often two or more minutes longer, than the pleasant chewing life of a conventional fruit-flavored chewing gum containing the same level of free fruit flavor.

It is also a feature and advantage of the invention to provide a method of making a fruit-flavored chewing gum which maximizes the efficient use of free fruit flavor by enhancing the long-term flavor intensity without sacrificing the initial flavor burst.

It is also a feature and advantage of the invention to provide the chewing gum manufacturer with physiochemical characteristics, and relationships based on these characteristics, which permit planned manufacture of free fruit-flavored chewing gums having both an initial burst of flavor and enhanced long-term flavor release.

It is also a feature and advantage of the invention to coordinate the use of a calculated Solubility Parameter for at least one, and possibly a mixture, of free fruit flavor ingredients with at least one selected water-insoluble chewing gum ingredient so as to provide the manufacturer the option of predictably making a free fruit-flavored chewing gum having both an initial burst of flavor and a pleasant longer-lasting chewing life.

The foregoing and other features and advantages of the invention will become further apparent from the following detailed description of the presently preferred embodiments, read in conjunction with the accompanying examples and drawings. The detailed description, examples and drawings are merely illustrative rather than limiting, with the scope of the invention being defined by the appended claims and equivalents thereof.

BRIEF DESCRIPTION OF THE FIGURES

FIG. 1 corresponds to the samples described in Examples 1 and 2.

FIG. 3 corresponds to the samples described in Examples 3 and 4.

DETAILED DESCRIPTION OF THE PRESENTLY PREFERRED EMBODIMENTS

Figure 1:
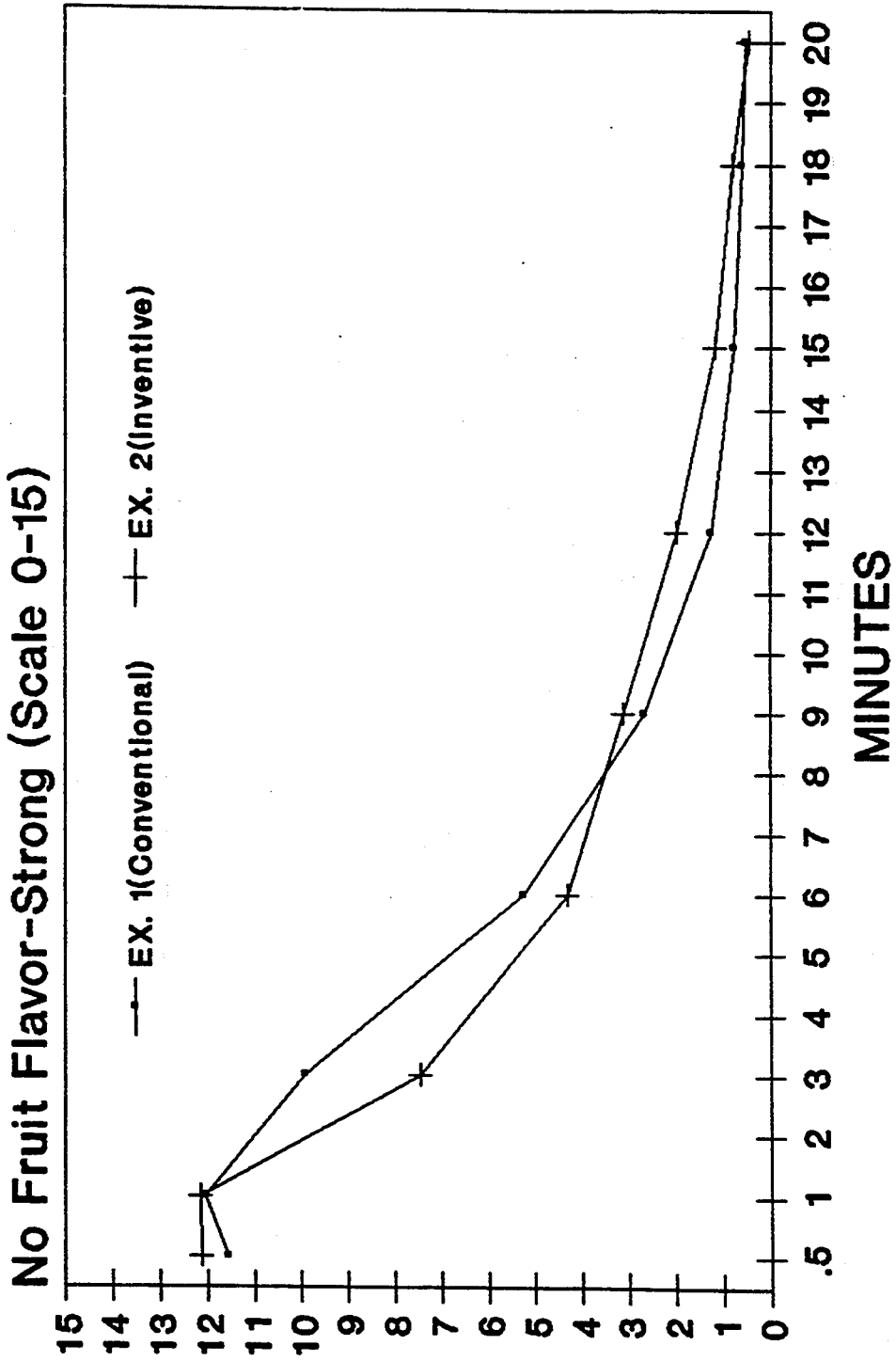
FIG. 1 shows the fruit flavor intensity as a function of chewing time for a conventional fruit-flavored chewing gum versus a fruit-flavored chewing gum made according to the method of the invention, using equal starting levels of free fruit flavor.

Different materials or ingredients having the same or similar Solubility Parameters have an increased tendency to become attracted to and/or mixed with each other. The present invention makes use of this fact by providing, in the chewing gum, at least 7% by weight of a water-insoluble ingredient having the same or similar Solubility Parameter as the free fruit flavoring agent whose long-term flavor is being enhanced. By attracting or attaching molecules of a fruit flavoring agent to the selected water-insoluble ingredient, the free fruit flavoring agent acquires a tendency to dissipate or release more slowly and over a longer period of time. Surprisingly, this is accomplished without compromising any of the initial flavor burst which is desirably associated with fruit-flavored chewing gum.

As explained in the above-identified publication by Dr. Billmeyer entitled "Textbook of Polymer Science", the easiest way to calculate the Solubility Parameter for an ingredient is to use the molar attraction constants E presented in Table 1 below:

TABLE 1

Molar Attraction Constants E
(Dimensions = $J \cdot m^3)^{\frac{1}{2}} \times 10^{-3}$/mole)

| Group (i) | $E_i$ | Group (i) | $E_i$ |
|---|---|---|---|
| —$CH_3$ | 301.5 | —$NH_2$ | 463.8 |
| —$CH_2$— | 269 | —NH— | 368.5 |
| >CH— | 176 | —N— | 125 |
| >C< | 65.6 | —C≡N | 725.8 |
| $CH_2$= | 259 | NCO | 734 |
| —CH= | 244 | —S— | 429 |
| >C= | 173 | $Cl_2$ | 701 |
| —CH=aromatic | 240 | Cl primary | 420 |
| —C=aromatic | 200 | Cl secondary | 426 |
| —O-ether, acetal | 235 | Cl aromatic | 329.5 |
| —O-epoxide | 361 | F | 84.6 |
| —COO— | 668.5 | Conjugation | 47.6 |
| >C=O | 538 | cis | −14.6 |
| —CHO | 599 | trans | −27.6 |
| $(CO)_2O$ | 1161 | 6-Membered ring | 48 |
| —OH | 462.6 | ortho | 14.8 |
| OH aromatic | 350 | meta | 13.5 |
| —H acidic dimer | −103.4 | para | 82.5 |

In the above table, which is derived from the Billmeyer publication referenced above and converted to the indicated dimensions, certain values of E for particular chemical moieties are presented. When calculating the Solubility Parameter for a particular chewing gum ingredient such as, for example, a water-insoluble ingredient, all of the moieties contained in the ingredient are summed over the molecular configuration of that ingredient, or of the repeating unit if the ingredient is a polymer. The summation is then multiplied by the density of the ingredient and divided by its molecular weight (repeating unit molecular weight for polymers), to yield the Solubility Parameters.

Before selecting the specific water-insoluble ingredient to be used, the Solubility Parameter of the free flavoring agent whose long-term flavor is being enhanced, must be known or determined. The following Table 2 provides the Solubility Parameters for a large number of free fruit flavoring agents.

TABLE 2

Solubility Parameters for Free
Fruit Flavoring Agents

| Fruit Flavor | δ (S.P.U.) |
|---|---|
| lemon oil (limonene) | 15.3 |
| orange oil (limonene) | 15.3 |
| ethyl butyrate | 17.4 |
| amyl acetate | 17.4 |
| ethyl propionate | 17.2 |
| ethyl acetate | 18.6 |
| ethyl alcohol | 26.0 |
| ethyl caproate | 17.2 |
| methyl salicylate | 21.7 |
| eugenol | 19.3 |
| benzaldehyde | 19.2 |
| cinnamic aldehyde | 20.5 |
| l-carvone | 17.6 |
| isoamyl acetate | 16.0 |
| isobutyl acetate | 17.0 |

TABLE 2-continued

Solubility Parameters for Free
Fruit Flavoring Agents

| Fruit Flavor | δ (S.P.U.) |
|---|---|
| methyl acetate | 19.5 |

The next step is to select a water-insoluble ingredient, i.e., an ingredient that will not dissolve during chewing, yet which has a Solubility Parameter as close as possible to that of the free flavoring agent. The selected water-insoluble ingredient, which serves as a "restrainer" for the free fruit flavoring agent in the chewing gum, may be a properly selected conventional chewing gum ingredient (e.g. an elastomer) or an unconventional chewing gum ingredient. Properly selected polymers are especially useful as restrainers of free fruit flavors because they do not dissolve in the mouth during chewing. The following Table 3 lists the Solubility Parameters for many conventional water-insoluble chewing gum ingredients.

TABLE 3

Solubility Parameters for Water-Insoluble
Chewing Gum Ingredients

| Ingredient | δ (S.P.U.'s) |
|---|---|
| Waxes | |
| Microcrystalline wax, m.p. = 180° F. | 17.5 |
| Microcrystalline wax, m.p. = 170° F. | 17.3 |
| Paraffin wax | 17.5 |
| White paraffin wax, m.p. = 145° F. | 17.3 |
| White paraffin wax, m.p. = 135° F. | 17.1 |
| Synthetic Elastomers | |
| 98.5% isobutylene-1.5% isoprene, mol. wt. = 120,000–150,000 | 16.0 |
| Polyisobutylene, mol. wt. = 50,000–80,000 | 16.0 |
| 75% butadiene (molar)/25% styrene (molar) copolymer, mol. wt. = 80,000–100,000 | 17.0 |
| 50% butydiene (molar)/50% styrene (molar) copolymer | 17.0 |
| Natural Elastomers | |
| Jelutong | 17.0 |
| Massarandula balatu | 17.0 |
| Sorva | 17.0 |
| Resins | |
| Glycerol ester of polymerized rosin | 18.2 |
| Glycerol ester of hydrogenated rosin | 18.2 |
| Glycerol ester of wood rosin | 18.5 |
| Plasticizers | |
| Glycerol monostearate | 19.0 |
| Glycerol Triacetate | 19.3 |
| Fats, Oils | |
| Hydrogenated cottonseed oil | 18.3 |
| Hydrogenated soybean oil | 18.8 |
| Partially hydrogenated vegetable oil | 21.0 |
| Vinyl Polymers | |
| Polyvinyl acetate (mol. wt. = 25,000) | 19.1 |
| Polyvinyl acetate (mol. wt. = 50,000–80,000) | 18.9 |

In order to effectively enhance the long-term flavor, the selected restrainer must have a Solubility Parameter within ±2.0 S.P.U.'s of the Solubility Parameter of the free fruit flavoring agent being enhanced. The Solubility Parameter of the restrainer will preferably be within ±1.0 S.P.U.'s of that of the free fruit flavoring agent, most preferably within −0.5 S.P.U.'s of that of the free fruit flavoring agent.

The effectiveness of the restrainer for providing long-term flavor enhancement increases with the amount of restrainer used. In order to meet the objectives of the invention, the selected restrainer should be provided in an amount equal to at least 7% by weight of the entire chewing gum composition, preferably at least 9% by weight of the entire chewing gum composition, most preferably at least 11% by weight of the entire chewing gum composition.

The amount of restrainer required is also dependent on the amount of free fruit flavor whose long-term intensity is being enhanced. In order to meet the objectives of the invention, the selected restrainer should be provided in an amount equal to at least four times the weight percentage of the free flavor ingredient whose long term flavor is being enhanced, preferably at least five times the weight percentage of the free fruit flavor, most preferably at least six times the weight percentage of the free fruit flavor.

As stated above, the invention is effective for the purpose of enhancing the long-term intensity of free fruit flavor without relying on encapsulating techniques and without significantly affecting the intensity of the initial flavor burst. Therefore, it is most preferred that the fruit-flavored chewing gum prepared by this method be substantially free of encapsulated fruit flavor, or at least that less than about 1.0% by weight encapsulated fruit flavor is present. In situations where the presence of encapsulated fruit flavor is desired for one reason or another, the amount of free fruit flavor should exceed the amount of fruit flavor that has been encapsulated, preferably by a weight ratio of at least 2:1.

In order to achieve the benefit of enhanced long-term flavor intensity without sacrificing initial flavor burst, it is not necessary to increase the amount of free fruit flavor in the method of the invention above the level that would be present in conventional fruit-flavored gums. However, a surprising benefit arises when the amount of free fruit flavor in chewing gum prepared by this method is raised above conventional levels. It has been discovered that the free fruit flavor level can be increased significantly above conventional levels in the inventive gums without raising the initial flavor burst to excessive levels, so that an increase in flavor intensity is observed at all times during the chew except the initial burst.

In other words, a significant increase the free fruit flavor levels in conventional chewing gums often had the undesirable effect of raising the initial flavor burst to excessive intensity, without solving the problem of rapid flavor dissipation. Also, high free fruit flavor levels tend to soften the gum excessively, causing the gum to be too soft during chewing. In the present method, by comparison, the level of free fruit flavor can be significantly increased above conventional levels without significantly affecting the intensity of the initial flavor burst, and without significantly softening the gum, while greatly enhancing the flavor intensity later in the chew via slower flavor dissipation.

Accordingly, the chewing gum prepared by this method can generally be provided with anywhere between about 0.3–10.0% by weight of free (not encapsulated) fruit flavoring agent. Preferably, the level of free fruit flavoring agent provided is about 1.0–6.0% by weight of the chewing gum, most preferably about 1.5–4.0% by weight of the chewing gum.

The amount of free fruit flavor desired will vary depending on the type of fruit flavor employed. Any free fruit flavor can be used with the method of the invention, including any of the fruit flavors listed in Table 2.

The selected water-insoluble restrainer is preferably a polymer which has a Solubility Parameter as close as possible to that of the free fruit flavor being enhanced. The restrainer may be added during manufacture of the gum base and included as part of the base, or may be added separately during manufacture of the fruit-flavored chewing gum product. It is important that the restrainer be well dispersed in the chewing gum in order to come into contact with, and restrain, as much of the free fruit flavoring agent as possible. Therefore, if the restrainer is difficult to disperse, it is preferable to add the restrainer during manufacture of the gum base, and as early as possible, in order to ensure its maximum ultimate dispersion in the chewing gum.

Medium to high molecular weight polyvinyl acetates (M.W. = 30,000–80,000) are examples of restrainers that should be added during manufacture of the gum base, and as early as possible, to obtain their thorough dispersion and achieve the maximum long-term flavor enhancement. Because of their desirable Solubility Parameter of around 19, the polyvinyl acetates act as excellent restrainers for a large number of free fruit flavor ingredients. It has also been learned that polyvinyl acetates perform better as a restrainer when little or no gum base plasticizer is present in the chewing gum. It is believed that gum base plasticizers, for example, glycerol triacetate, tend to soften polyvinyl acetate and reduce its flavor restraining effect. Therefore, the chewing gum preferably is provided with no more than 1.0% by weight gum base plasticizer, more preferably no more than 0.5% by weight gum base plasticizer, and is most preferably substantially free of gum base plasticizer, when polyvinyl acetate is used.

Once a polymer restrainer has been properly selected based on its Solubility Parameter, there are a variety of ways to optimize its long term flavor enhancing performance. As explained above, the flavor enhancement generally increases with increasing amount of restrainer provided in the chewing gum. If the restrainer is formulated as part of the gum base, then the flavor enhancement effect will increase with increasing gum base levels in the chewing gum.

Another technique for increasing the effectiveness of the restrainer is to increase its molecular weight. While not intending to be bound by theory, it is believed that higher molecular weight polymers offer a greater hindrance to immediate penetration by water during chewing. Therefore, when a fruit flavoring molecule becomes attached or attracted to a restrainer of higher molecular weight, the flavor molecule is less likely to be immediately exposed to water during chewing. As the gum is chewed, the longer restrainer molecule is caused to twist and turn as the flavor molecules attached at various locations along the polymer chain are gradually released.

Another reason to select polyvinyl acetate as the restrainer is because of its compatibility with fruit flavor esters. It is believed that esters, like acetates, are very compatible with polyvinyl acetate because of their similar chemical structures. Therefore, polyvinyl acetate is the most preferred restrainer for use in gum base and for a fruit flavored gum product. Fruit flavors are readily absorbed (especially acetates) in polyvinyl acetate and act as a plasticizer for polyvinyl acetate.

The method of the invention may be used to prepare a new free fruit-flavored chewing gum from scratch, or may be used to convert an existing fruit-flavored chewing gum into one having enhanced long-term flavor intensity. When converting an existing gum, the first step is to determine whether the existing gum contains any restrainer, i.e., any water-insoluble ingredient having a Solubility Parameter within ±2.0 S.P.U.'s of the Solubility Parameter of the free fruit flavor being enhanced. If the existing gum contains a restrainer, then it may be possible to accomplish the desired flavor enhancement by increasing the amount of the existing restrainer, and/or by using a higher molecular weight of the existing restrainer. If the existing gum does not contain a restrainer, then a suitable restrainer can be added, either during manufacture of the gum base or during manufacture of the chewing gum.

The next step is to add the restrainer, or increase its amount, and/or increase its molecular weight, until the desired long-term flavor enhancement is achieved. As a starting point, the restrainer should be provided in an amount equal to at least 7.0% by weight of the chewing gum, or four times the weight percentage of the free fruit flavor being enhanced. Then, the chewing gum sample can be tested for flavor intensity during chewing by a flavor panel, against the original product. If the pleasant chewing life (i.e. the time required for the flavor intensity to fall below 15% of its original level) has not been sufficiently increased by, for example, one minute, two minutes, or longer, then the level of restrainer can be increased, and/or its molecular weight increased, in further increments until the desired long-term flavor enhancement is achieved.

Once the pleasant chewing life has been sufficiently prolonged, then the intermediate and long-term flavor intensity can be further enhanced by increasing the amount of free flavoring agent in the chewing gum. As shown in the following Examples (especially Examples 3 and 4), it may be possible to more than double the amount of free flavoring agent once the type and amount of restrainer have been properly selected, without significantly increasing the intensity of the initial flavor burst, while at the same time greatly increasing the intermediate and long-term flavor intensity during chewing.

If the method of the invention is being used to prepare a new free fruit-flavored chewing gum from scratch, then the restrainer and flavoring agent should be selected with Solubility Parameters as close as possible to each other, and certainly within ±2.0 S.P.U.'s of each other. Samples may be prepared, and the procedures outlined above may be followed to determine the optimum type and amount of restrainer, and the optimum amount of free fruit flavor, that provide a chewing gum with the best combination of a pleasing initial flavor burst and enhanced intermediate and long-term flavor intensity.

The fruit-flavored chewing gum prepared according to the invention generally includes a water soluble bulk portion, a water insoluble chewing gum base portion, a water-insoluble restrainer (generally included in the gum base), and one or more free fruit flavoring agents. The water soluble portion dissipates over a period of time during chewing. The gum base portion and restrainer are retained in the mouth throughout the chewing process.

The insoluble gum base generally includes elastomers, resins, fats, oils, waxes, and inorganic fillers. The elastomers may include polyisobutylene, isobutylene-isoprene copolymer, styrene butadiene rubber and natural latexes such as chicle. The resins may include polyvinyl acetate, terpene resins, and rosin esters. Medium to high molecular weight polyvinyl acetate (M.W.=30,000–80,000) is a preferred resin, with a molecular weight of 40,000–50,000 being most preferred. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; gum base softeners, including glycerol monostearate and lecithin; and optional ingredients such as antioxidants, colors and emulsifiers. In accordance with the invention, gum base softeners should be kept to a minimum or eliminated when, as with polyvinyl acetate, they may hinder the performance of the restrainer. The gum base constitutes between 5–95% by weight of the chewing gum composition, more typically 10–50% by weight of the chewing gum, and most commonly 20–30% by weight of the chewing gum. When the restrainer is included in the gum base, the gum base must be present in an amount sufficient to ensure that the restrainer constitutes at least about 7% by weight of the chewing gum or four times the weight percentage of the free fruit flavor being enhanced, as explained above.

The water soluble portion of the chewing gum may include chewing gum softeners, bulk sweeteners, high intensity sweeteners, fruit flavoring agents and combinations thereof. Chewing gum softeners are added to the chewing gum in order to optimize the chewability and mouth feel of the gum. When used, the softeners generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly $30 \geqq 60\%$ by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Free fruit flavor should generally be present in the chewing gum in an amount within the range of about 0.3–10.0% by weight of the chewing gum, preferably between about 1.0–6.0% by weight of the chewing gum, most preferably between about 1.5–4.0% by weight of the chewing gum. Free fruit flavoring agents may include any of the ingredients listed in Table 2, or any other fruit flavoring agent. Additional (non-fruit) flavors may optionally be included such as peppermint oil, spearmint oil, other mint oils, clove oil, oil of wintergreen, anise and the like. Natural or artificial flavoring agents and components may be used in the chewing gum of the invention. Natural and artificial flavoring agents may be combined in any sensorially acceptable fashion.

Optional ingredients such as colors, emulsifiers, pharmaceutical agents and additional flavoring agents may also be included in chewing gum.

The chewing gum according to the invention is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into sticks. Generally, the ingredients are mixed by first melting the gum base and adding it to the running mixer. The gum base may alternatively be melted in the mixer. Color and emulsifiers can be added at this time.

A chewing gum softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

As stated above, the water-insoluble restrainer may be added initially into the chewing gum base, or later added during manufacture of the chewing gum. When medium to high molecular weight polyvinyl acetate is used as the restrainer, it should be added during manufacture of the gum base, at or near the front of the otherwise conventional mixing cycle, with the elastomer and filler. Once the polyvinylacetate has been dispersed, the remaining gum base ingredients (waxes, emulsifiers, etc.) can be added. Typically, a sigma blade batch mixer can be used to make the gum base.

A wide range of changes and modifications to the embodiments of the invention described above will be apparent to persons skilled in the art. The following examples are not to be construed as imposing limitations on the invention, but are included merely to illustrate preferred embodiments.

MIXED FRUIT FLAVOR USED FOR EXAMPLES

A fruit flavor may contain a mixture of esters, lemon and orange oils, as well as aldehydes and spice materials. The mixed fruit flavor used in all the examples includes the following components with Solubility Parameters:

|  | % | δ (S.P.U.) |
|---|---|---|
| Esters (ethyl butyrate, amyl acetate, ethyl propionate, ethyl acetate, ethyl caproate, methyl salicylate) | 68.0 | 18.0 |
| Lemon and orange oil (limonene) | 26.5 | 15.3 |
| Spices (Eugenol and cinnamic aldehyde) | 5.5 | 19.6 |
| Mixed fruit flavor | 100.0 | 15.3–19.6 |

As can be seen from the mixed fruit flavor, the esters and spices have higher Solubility Parameters than the lemon and orange oil. The esters and spices have similar Solubility Parameters to polyvinyl acetate and the plasticizers. This suggests that the plasticizers and polyvinyl acetate may act as restrainers for these types of flavors, with polyvinyl acetate being most preferred, since the amount of plasticizers should be limited.

Also, the lemon and orange oils, whose principle component is limonene, have Solubility Parameters similar to the isobutylene-isoprene copolymer and polyisobutylene. Thus these elastomer materials would act as excellent restrainers for these types of fruit flavors. When a mixed fruit flavor is used as above, a combination of restrainers may be needed to give the flavor proper release characteristics to maintain the same quality flavor throughout.

EXAMPLE 1 (COMPARATIVE)

This Example illustrates the preparation of a conventional mixed fruit-flavored gum, using the mixed fruit flavor described above.

Initially, a conventional gum base was prepared using the following formulation:

| Ingredient | % By Weight In Gum Base |
|---|---|
| Isobutylene-isoprene copolymer | 10.1 |
| Polyisobutylene | 1.6 |
| Terpene resin | 26.9 |
| Low M.W. polyvinyl acetate (mol. wt. = 25,000) | 27.3 |
| Paraffin wax | 6.9 |
| Lecithin | 2.7 |
| Glycerol monostearate | 4.8 |
| Microcrystalline waxes | 6.4 |
| Hydrogenated vegetable oil | 2.0 |
| Calcium carbonate | 11.2 |
| Color | 0.1 |
| TOTAL | 100.00 |

When making the above gum base, a conventional mixing procedure was employed. A Werner-Pfleiderer production mixer was used to produce a 750-lb batch at 115° C. using a drive speed of 252 rpm and a steam pressure of 45 psi. The total mixing time was 2.5 hours. The following table shows when and how much of each ingredient was added during the mixing cycle. Note that the polyvinyl acetate was not added early in the cycle, in the conventional process.

| Ingredient | % Added | Time of Addition During Mixing Cycle |
|---|---|---|
| Isobutylene-isoprene | 10.1 | 0:00 |

-continued

| Ingredient | % Added | Time of Addition During Mixing Cycle |
|---|---|---|
| copolymer (ground) | | |
| Polyisobutylene | 1.6 | 0:00 |
| Calcium carbonate | 11.2 | 0:00 |
| Color | 0.1 | 0:00 |
| Terpene resin | 2.96 | 0:00 |
| Terpene resin | 2.96 | 0:30 |
| Terpene resin | 5.92 | 0:40 |
| Terpene resin | 7.53 | 0:50 |
| Terpene resin | 7.53 | 1:00 |
| Low M.W. polyvinyl acetate (mol. wt. = 25000) | 7.06 | 1:10 |
| Low M.W. polyvinyl acetate (mol. wt. = 25000) | 10.12 | 1:20 |
| Low M.W. polyvinyl acetate (mol. wt. = 25000) | 10.12 | 1:30 |
| Paraffin wax | 6.9 | 2:00 |
| Lecithin | 2.7 | 2:00 |
| Glycerol monostearate | 4.8 | 2:00 |
| Microcrystalline wax | 6.4 | 2:00 |
| Hydrogenated vegetable oil | 2.0 | 2:00 |
| TOTAL | 100.0 | 2:30 |

Next, a conventional mixed fruit-flavored chewing gum was prepared using the conventional base, according to the following formulation. Note that the amount of polyvinyl acetate in the resulting chewing gum (6.55%, or 27.3% of the base) is less than four times the weight percent of the free fruit flavor and is also less than the 7% minimum required for the invention.

| Ingredient | % By Weight In Chewing Gum |
|---|---|
| Conventional base | 24.0 |
| Glycerin | 1.15 |
| Glucose syrup | 7.30 |
| Sugar | 58.14 |
| Dextrose monohydrate | 7.28 |
| Lecithin | 0.13 |
| Free mixed fruit flavor | 2.00 |
| TOTAL | 100.0 |

The conventional mixed fruit-flavored chewing gum of Example 1 was evaluated for fruit flavor intensity as a function of time by a panel of trained sensory experts. The panelists evaluated the gum at different chewing times on a scale between zero and 15, wherein zero means no flavor intensity and 15 means very strong flavor intensity.

The results of the evaluation are shown in FIG. 1. As shown, the conventional chewing gum exhibited an initial flavor burst during chewing of 11.7–12.1 flavor intensity units (FIU's). The flavor intensity then dissipated steadily, falling below 15% of its original level (or 1.8 FIU's) after about eleven minutes of chewing. In other words, the conventional fruit-flavored gum of Example 1 had a pleasant chewing life of about 11 minutes.

Figure 2:
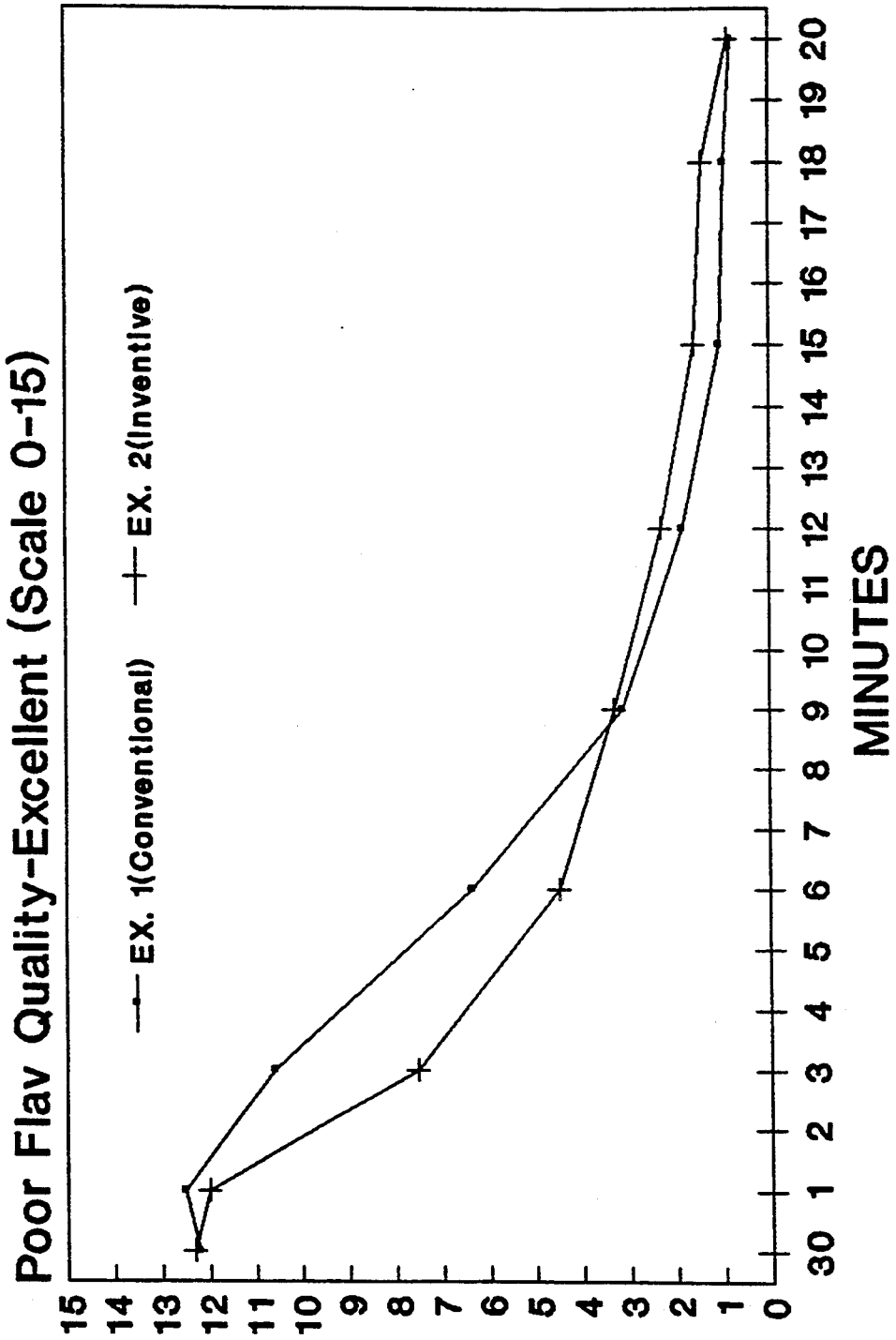
FIG. 2 shows the fruit flavor quality as a function of time for a conventional fruit-flavored chewing gum versus a fruit-flavored chewing gum made according to the method of the invention, as described in Examples 1 and 2.

The same panelists also evaluated the flavor quality on a scale of 0–15, with higher ratings indicating better flavor quality. The results of this evaluation are plotted in FIG. 2. As shown, the perceived flavor quality also dissipated with chewing time, although not as fast as the flavor intensity. Nevertheless, a comparison of FIGS. 1 and 2 indicates that higher perceived flavor quality generally correlates with higher levels of flavor intensity. This shows that higher flavor intensity is generally considered more desirable or pleasing, at least up to the level of the initial flavor burst.

EXAMPLE 2 (INVENTIVE)

This Example illustrates the preparation of an inventive mixed fruit-flavored gum, for comparison with Example 1, using the same mixed fruit flavor.

Initially, a gum base was prepared using a polyvinyl acetate restrainer at a higher level, and a higher average molecular weight, than used in Example 1. The inventive gum base had the following formulation:

| Ingredient | % By Weight In Gum Base |
|---|---|
| Isobutylene-isoprene copolymer | 7.0 |
| Polyisobutylene | 3.0 |
| Terpene rosin | 10.0 |
| Glycerol ester of hydrogenated resin | 10.0 |
| Low M.W. polyvinyl acetate (mol. wt. = 25,000) | 15.0 |
| Medium M.W. polyvinyl acetate (mol. wt. = 40,000) | 20.0 |
| Lecithin | 5.0 |
| Glycerol monostearate | 10.0 |
| Calcium carbonate | 20.0 |
| TOTAL | 100.0 |

As shown above, the inventive gum base of Example 2 differed from the conventional base of Example 1 in several significant respects, including a) the use of a higher amount of polyvinyl acetate, b) the use of higher molecular weight polyvinyl acetate, and c) the elimination of waxes, which act like gum base plasticizers. In order to prepare the gum base of Example 2, without using waxes or plasticizers, a different mixing procedure was also used. A Haake Rheocord 90 mixer was equipped with a 3000 E mixing bowl to produce a 450-gram batch at 115° C. and 40 rpm. The medium molecular weight polyvinyl acetate was added at the front of the mixing cycle, and the mixing cycle was shortened to 32 minutes. The following table shows when and how much of each ingredient was added at different times during the mixing cycle.

| Ingredient | % Added | Time of Addition During Mixing Cycle |
|---|---|---|
| Medium M.W. polyvinyl acetate (ground) | 20.0 | 0:00 |
| Isobutylene-isoprene copolymer | 7.0 | 0:00 |
| Calcium carbonate | 20.0 | 0:00 |
| Terpene resin | 5.0 | 0:00 |
| Terpene resin | 5.0 | 0:05 |
| Low M.W. polyvinyl acetate (ground) | 15.0 | 0:05 |
| Glycerol ester of hydrogenated rosin | 5.0 | 0:08 |
| Glycerol ester of hydrogenated rosin | 5.0 | 0:10 |
| Polyisobutylene | 3.0 | 0:13 |
| Glycerol monostearate | 10.0 | 0:23 |
| Lecithin | 5.0 | 0:30 |
| TOTAL | 100.0 | 0:32 |

Next, an inventive mixed fruit-flavored chewing gum was prepared using the inventive base, according to the following formulation. The following formulation is the same as that used in preparing the gum of Example 1 except that the inventive base was substituted for the conventional base.

| Ingredient | % By Weight in Chewing Gum |
| --- | --- |
| Inventive base | 24.0 |
| Glycerin | 1.15 |
| Glucose syrup | 7.30 |
| Sugar | 58.14 |
| Dextrose monohydrate | 7.28 |
| Lecithin | 0.13 |
| Free mixed fruit flavor | 2.00 |
| TOTAL | 100.0 |

Note that the inventive chewing gum of Example 2 contained a total of 8.4% by weight polyvinyl acetate restrainer. In accordance with the invention, and unlike the gum of Example 1, this is more than four times the level of free fruit flavoring agent in the chewing gum and is also higher than the minimum level of 7% restrainer.

The inventive fruit-flavored chewing gum of Example 2 was evaluated for fruit flavor intensity as a function of time in the same manner explained in Example 1. The results of this evaluation are shown in FIG. 1. As shown, the inventive chewing gum exhibited an initial flavor burst of almost identical intensity to the flavor burst achieved with the conventional gum of Example 1. However, the flavor intensity of Example 2 dissipated at a different rate, and did not fall below 15% of its initial intensity level (about 1.8 F.I.U's) until about 13 minutes of chewing. In other words, the inventive fruit-flavored gum of Example 2 had a pleasant chewing life about two minutes longer than that of the conventional fruit-flavored gum of Example 1.

As shown in FIG. 1, the inventive gum of Example 2 actually exhibited a lower flavor intensity than the conventional gum of Example 1 at intermediate chewing times of from 1 to 8 minutes. This is not considered a drawback to the invention because, as shown in the following Examples 3 and 4, the intermediate and long-term flavor intensity of the inventive chewing gum can be greatly enhanced without increasing the initial flavor burst, by simply adding more free fruit flavor to the gum.

EXAMPLE 3 (COMPARATIVE)

This Example illustrates the preparation of another conventional mixed fruit-flavored gum, using the same mixed fruit flavor.

Initially, a conventional gum base was prepared according to the following formulation:

| Ingredient | % By Weight In Gum Base |
| --- | --- |
| Isobutylene-isoprene copolymer | 10.1 |
| Polyisobutylene | 1.6 |
| Terpene resins | 26.9 |
| Low M.W. polyvinyl acetate (mol. wt. = 25,000) | 27.3 |
| Lecithin | 2.7 |
| Glycerol monostearate | 4.8 |
| Microcrystalline/paraffin wax | 13.3 |
| Hydrogenated vegetable oil | 2.0 |
| Calcium carbonate | 11.2 |
| Color/BHT | 0.1 |
| TOTAL | 100.0 |

As shown above, the gum base of Example 3 had essentially the same composition as the gum base of Example 1, described above. The gum base of Example 3 was also made using the same conventional procedure as the gum base of Example 1, described above.

Next, a conventional mixed fruit-flavored chewing gum was prepared using the conventional base, according to the following formulation. Note that the amount of polyvinyl acetate in the resulting chewing gum (5.19%, or 27.3% of the base) exceeds four times the weight of the free fruit flavor but is less than the 7% minimum required for the invention.

| Ingredient | % By Weight In Chewing Gum |
| --- | --- |
| Conventional base | 19.0 |
| Glycerin | 1.15 |
| Glucose syrup | 13.91 |
| Lecithin | 0.13 |
| Sugar | 57.72 |
| Dextrose monohydrate | 7.28 |
| Free mixed fruit flavor | 0.81 |
| TOTAL | 100.0 |

Figure 3:
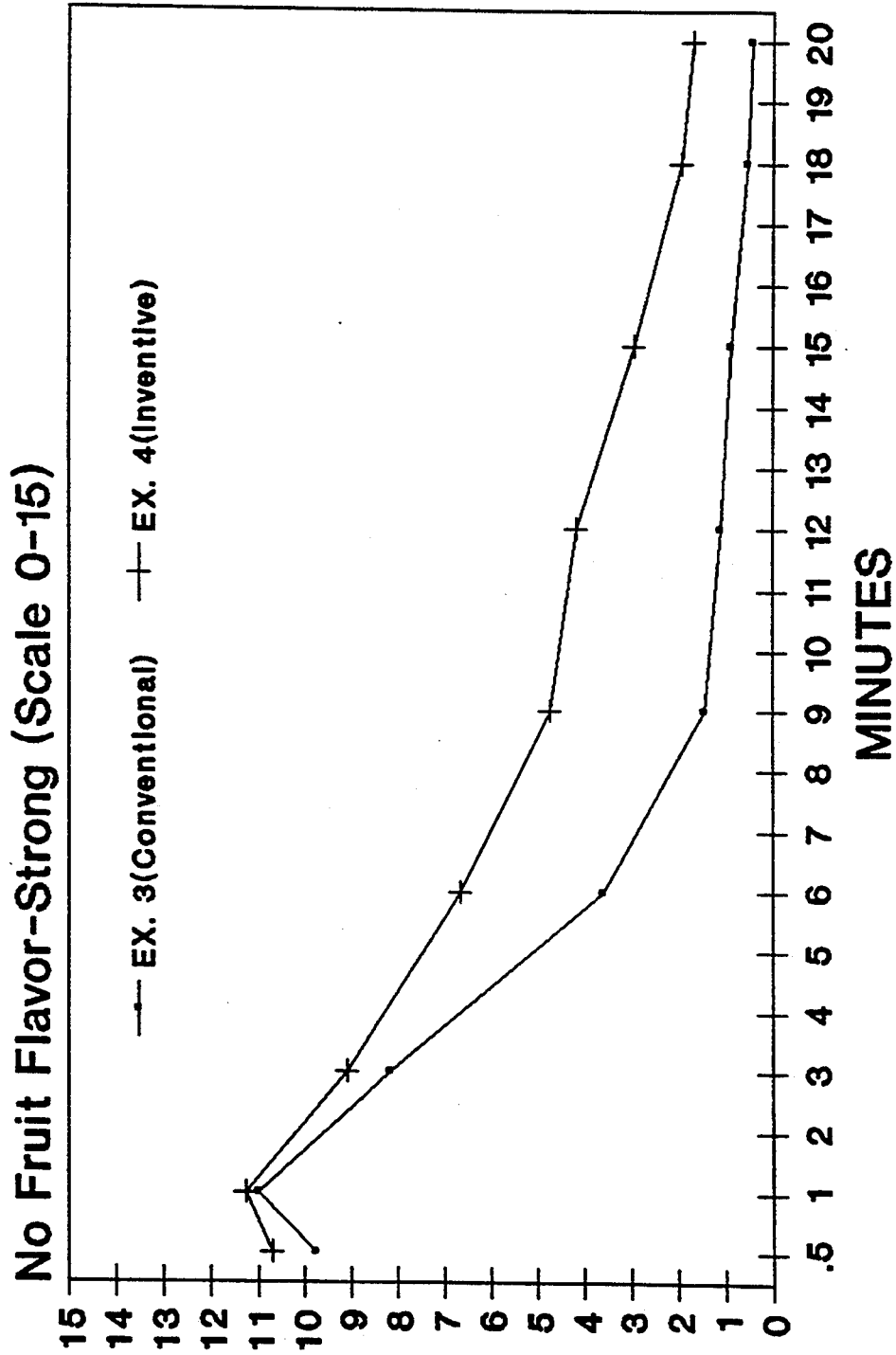
FIG. 3 shows the fruit flavor intensity as a function of time for a conventional fruit-flavored chewing gum versus a fruit-flavored chewing gum made according to the method of the invention, wherein the gum of the invention contains a higher level of free fruit flavor to compensate for the longer period of desired enhanced flavor release.

The conventional mixed fruit-flavored gum of Example 3 was evaluated for fruit flavor intensity as a function of time using the same procedure explained in regard to Examples 1 and 2. The results of the evaluation are shown in FIG. 3. As shown, the conventional gum of Example 3 exhibited an initial flavor burst of 9.8–11.0 F.I.U.'s when chewing was commenced. Thereafter, the flavor intensity dissipated steadily, falling below 15% of its original value (about 1.6 F.I.U.'s) after about nine minutes of chewing. In other words, the conventional fruit-flavored gum of Example 3 had a pleasant chewing life of about nine minutes.

Figure 4:
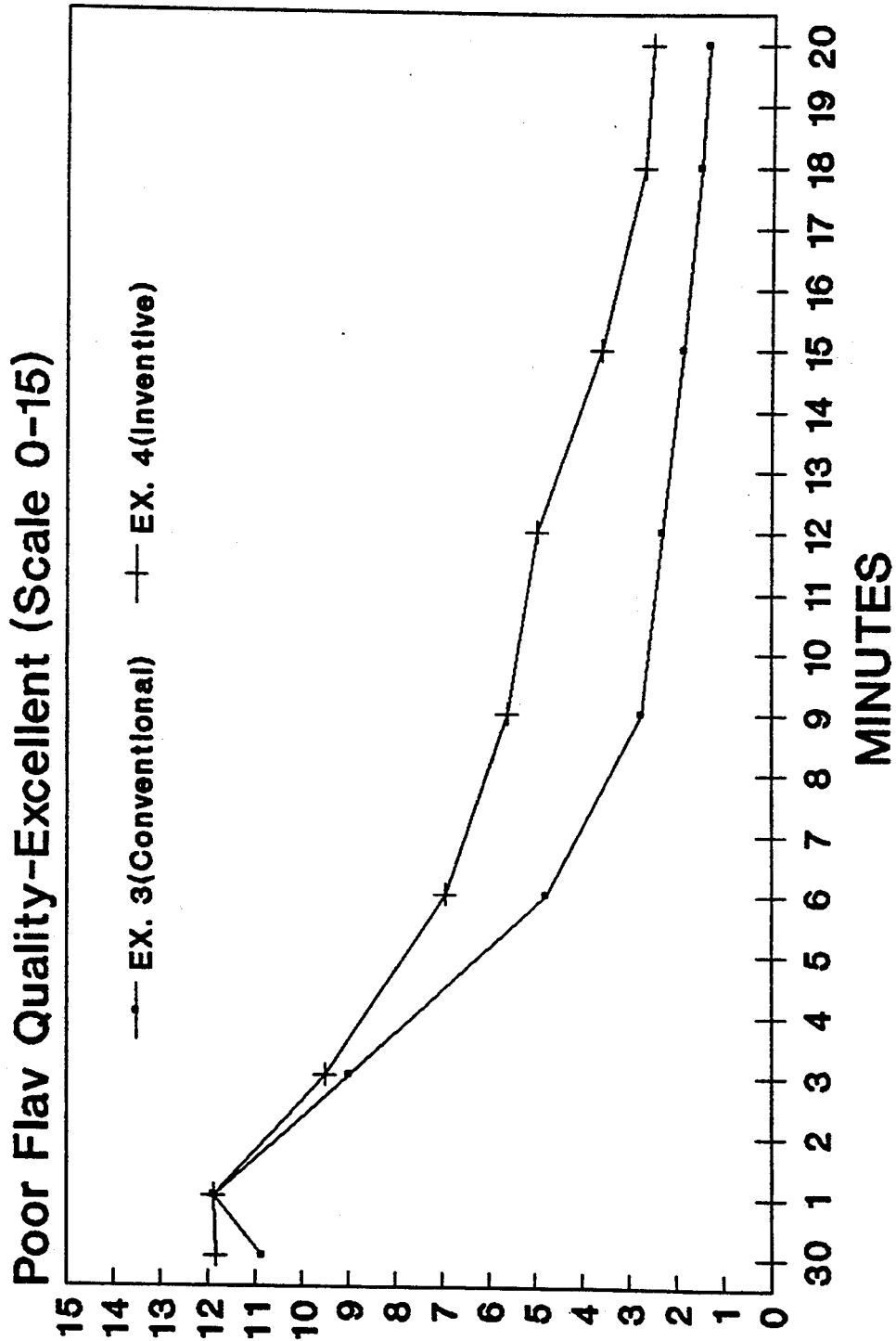
FIG. 4 shows the fruit flavor quality as a function of time for a conventional fruit-flavored chewing gum versus a fruit-flavored chewing gum made according to the method of the invention, as described in Examples 3 and 4.

The same panelists also evaluated the flavor quality. The results of this evaluation are shown in FIG. 4. As shown, the perceived flavor quality also dissipated with time, again indicating that higher perceived flavor quality generally correlates with higher perceived flavor intensity.

EXAMPLE 4 (INVENTIVE)

This Example illustrates the preparation of an inventive mixed fruit-flavored chewing gum, for comparison with Example 3, wherein the effects of a higher level of the same mixed flavor on intermediate and long-term flavor intensity were observed.

Initially, a gum base was prepared using a polyvinyl acetate restrainer at a higher level, and having a higher average molecular weight, than used in Example 3. The inventive gum base had the following formulation:

| Ingredient | % By Weight In Gum Base |
| --- | --- |
| Isobutylene-isoprene copolymer | 7.0 |
| Polyisobutylene | 3.0 |
| Terpene resin | 10.0 |
| Glycerol ester of wood rosin | 9.9 |
| Low M.W. polyvinyl acetate (mol. wt. = 25,000) | 14.5 |
| Medium M.W. polyvinyl acetate (mol. wt. = 40,000) | 20.0 |
| Lecithin | 5.0 |
| Glycerol monostearate | 10.0 |
| Calcium carbonate | 19.95 |
| Color | 0.6 |
| BHT | 0.05 |
| TOTAL | 100.0 |

As shown above, the inventive gum base of Example 4 differed from the conventional gum base of Example 3 in several significant respects including a) the use of a higher amount of polyvinyl acetate, b) the use of higher molecular weight polyvinyl acetate, and c) the elimination of waxes, which act like plasticizers. The gum base of Example 4 was prepared on a production scale (758 lbs.) using a Werner-Pfleiderer mixer with a 252 rpm drive shaft speed, steam pressure of 45 psi, and a total mixing time of 2:00 hours. The following table shows when and how much of each ingredient was added at different times during the mixing cycle.

| Ingredient | % Added | Time of Addition During Mixing Cycle |
|---|---|---|
| Color | 0.6 | 0:00 |
| Calcium carbonate | 19.95 | 0:00 |
| Isobutylene-isoprene copolymer | 7.0 | 0:00 |
| Glycerol ester of wood rosin | 4.3 | 0:00 |
| Polyisobutylene | 3.0 | 0:00 |
| Terpene resin | 5.0 | 0:30 |
| Medium M.W. polyvinyl acetate (ground) | 10.0 | 0:45 |
| Medium M.W. polyvinyl acetate (ground) | 10.0 | 0:55 |
| Terpene resin | 5.0 | 1:05 |
| Low M.W. polyvinyl acetate (ground) | 14.5 | 1:15 |
| Glycerol ester of wood rosin | 5.6 | 1:25 |
| BHT | 0.05 | 1:40 |
| Glycerol monostearate | 10.0 | 1:40 |
| Lecithin | 5.0 | 1:40 |
| TOTAL | 100.0 | 2:00 |

Next, an inventive mixed fruit-flavored chewing gum was prepared using the inventive base. The following formulation is generally similar to that used to prepare the gum of Example 3 except that a) the inventive base was substituted in place of the conventional base, b) the amount of gum base was increased, c) the amount of free fruit flavor was increased, and d) the amount of glucose syrup was lowered to make up for the foregoing increases. Also, the lecithin was eliminated and a minor amount of high intensity sweetener was added to account for the reduction in glucose syrup.

| Ingredient | % By Weight In Chewing Gum |
|---|---|
| Inventive base | 24.0 |
| Glycerin | 1.15 |
| Glucose syrup | 7.30 |
| Sugar | 57.82 |
| Dextrose monohydrate | 7.28 |
| Free mixed fruit flavor | 2.00 |
| 20% Active encapsulated aspartame | 0.45 |
| TOTAL | 100.0 |

Note that the inventive chewing gum of Example 4 contained a total of 8.3% by weight polyvinyl acetate restrainer. In accordance with the invention, this is more than four times the level of free fruit flavor and is also higher than the minimum level of 7% restrainer.

The inventive fruit-flavored chewing gum of Example 4 was evaluated for fruit flavor intensity as a function of time and compared with Example 3. The results of the comparison are plotted in FIG. 3. As shown, the inventive gum of Example 4 surprisingly had an initial flavor burst about equal to that of Example 3 even though the amount of free flavoring agent was more than doubled. Thereafter, the gum of Example 4 exhibited much higher flavor intensity than the gum of Example 3 throughout the entire twenty minutes of chewing. In fact, the gum of Example 4 never approached or fell below 15% of its original flavor intensity during the twenty minutes of chewing.

The foregoing illustrates that the inventive chewing gums of the invention can utilize higher than normal flavor levels in an extremely beneficial fashion, by enhancing medium and long-term flavor intensity without exaggerating the intensity of the initial flavor burst.

It should be appreciated that the products of the present invention are capable of being exhibited in the form of a variety of embodiments, only a few of which have been illustrated and described above. The invention may be embodied in other forms without departing from its spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of making a free fruit-flavored chewing gum having enhanced long-term flavor, comprising the steps of:

selecting a free fruit flavoring agent having a cohesive energy density and a solubility parameter, in S.P.U.'s, defined as the square root of the cohesive energy density;

selecting a water-insoluble restrainer having a solubility parameter within about ±2.0 S.P.U.'s of the solubility parameter of the free fruit flavoring agent, the solubility parameter of the restrainer defined as $$\delta = \frac{\rho \Sigma E_i}{MW};$$

preparing a chewing gum mixture including about 5–95% be weight of a bulk sweetener, about 5–95% by weight of a chewing gum base, at least about 7.0% by weight of the restrainer, and about 0.3–10% by weight of the free fruit flavoring agent.

2. The method of claim 1, wherein the selected water-insoluble restrainer has a solubility parameter within about ±1.0 S.P.U.'s of the solubility parameter of the free fruit-flavored agent.

3. The method of claim 1, wherein the selected water-insoluble restrainer has a solubility parameter within about ±0.5 S.P.U.'s of the solubility parameter of the free fruit flavoring agent.

4. The method of claim 1, wherein the restrainer is provided in an amount equal to at least about 9% by weight of the chewing gum mixture.

5. The method of claim 1, wherein the restrainer is provided in an amount equal to at least about 11% by weight of the chewing gum mixture.

6. The method of claim 1, wherein the restrainer is provided in an amount equal to at least about four times the weight percentage of the free fruit flavoring agent.

7. The method of claim 1, wherein the restrainer is provided in an amount equal to at least about five times the weight percentage of the free fruit flavoring agent.

8. The method of claim 1, wherein the restrainer comprises polyvinyl acetate.

9. The method of claim 1, wherein the restrainer comprises a mixture of low molecular weight polyvinyl acetate and medium to high molecular weight polyvinyl acetate.

10. The method of claim 1, wherein the free fruit flavoring agent is provided in an amount equal to about 1.0–6.0% by weight of the chewing gum.

11. The method of claim 1, wherein the free fruit flavoring agent is provided in an amount equal to about 1.5–4.0% by weight of the chewing gum.

12. A method of enhancing the long-term flavor of a free fruit-flavored chewing gum, comprising the steps of:

determining the solubility parameter of a free fruit flavoring agent in the chewing gum, the solubility parameter of the flavoring agent defined, in S.P.U.'s, as a square root of cohesive energy density;

selecting a water-insoluble restrainer having a solubility parameter within about ±2.0 S.P.U.'s of the solubility parameter of the free fruit flavoring agent, the solubility parameter of the restrainer defined, in S.P.U.'s, as $$\delta = \frac{\rho \Sigma E_i}{MW};$$

adding the restrainer to the chewing gum in an amount sufficient to enhance the long-term flavor provided by the free fruit flavoring agent.

13. The method of claim 12, further comprising the step of increasing the average molecular weight of the restrainer to provide further long-term flavor enhancement.

14. The method of claim 12, further comprising the step of increasing the amount of free fruit flavoring agent in the chewing gum.

15. The method of claim 12, wherein the selected restrainer has a solubility parameter within about ±1.0 S.P.U.'s of the solubility parameter of the free fruit flavoring agent.

16. The method of claim 12, wherein the selected restrainer has a solubility parameter within about ±0.5 S.P.U.'s of the solubility parameter of the free fruit flavoring agent.

17. A method of prolonging the pleasant chewing life of a fruit-flavored chewing gum, comprising the steps of:

providing a chewing gum including about 0.3–10% by weight of a free fruit flavoring agent whose solubility parameter is defined as a square root of cohesive energy density;

providing a polymer restrainer having a solubility parameter within about ±2.0 S.P.U.'s of the solubility parameter of the free fruit flavoring agent, the solubility parameter of the restrainer defined as $$\delta = \frac{\rho \Sigma E_i}{MW};$$

adding the restrainer to the free fruit-flavored chewing gum in an amount sufficient to provide a pleasant chewing life of at least about 10–15 minutes.

18. The method of claim 17, wherein the restrainer is added in an amount sufficient to prolong the pleasant chewing life of the gum by at least about one minute.

19. The method of claim 17, wherein the restrainer is added in an amount sufficient to prolong the pleasant chewing life of the gum by at least about two minutes.

20. The method of claim 17, further comprising the step of increasing the average molecular weight of the restrainer.

21. The method of claim 17, wherein the restrainer comprises at least some medium to high molecular weight polyvinyl acetate.

22. The method of claim 17, further comprising the step of increasing the amount of the free fruit flavoring agent to provide enhanced intermediate and long-term fruit flavor.

* * * * *

UNITED STATES PATENT AND TRADEMARK OFFICE
CERTIFICATE OF CORRECTION

PATENT NO. : 5,413,799
DATED : May 9, 1995
INVENTOR(S) : Joo H. Song et al.   Page 1 of 2

It is certified that error appears in the above-indentified patent and that said Letters Patent is hereby corrected as shown below:

On the Title Page

In column 1, line 2, after "CHEWING" insert --GUM--.

In the Claims

In claim 1, lines 13-17 (column 18, lines 45-49), delete the following:

$$\delta = \frac{\rho \Sigma E_i}{MW};$$

and substitute the following:

$$\delta = \frac{\rho \Sigma E_i}{MW}; \text{and}$$

In claim 1, line 19 (column 18, line 51), delete "be" and substitute --by--.

In claim 12, lines 14-17 (column 19, lines 36-39), delete the following:

$$\delta = \frac{\rho \Sigma E_i}{MW};$$

and substitute the following:

$$\delta = \frac{\rho \Sigma E_i}{MW}; \text{and}$$

UNITED STATES PATENT AND TRADEMARK OFFICE
CERTIFICATE OF CORRECTION

PATENT NO. : 5,413,799
DATED : May 9, 1995
INVENTOR(S) : Joo H. Song et al.          Page 2 of 2

It is certified that error appears in the above-indentified patent and that said Letters Patent is hereby corrected as shown below:

In the Claims (cont.)

In claim 17, lines 12-16 (column 20, lines 23-27), delete the following:

$$\delta = \frac{\rho \Sigma E_i}{MW};$$

and substitute the following:

$$\delta = \frac{\rho \Sigma E_j}{MW}; \text{and}$$

Signed and Sealed this

Sixth Day of August, 1996

Attest:

BRUCE LEHMAN

*Attesting Officer*     *Commissioner of Patents and Trademarks*